(12) United States Patent
Rashid-Farrokhi et al.

(10) Patent No.: US 6,400,780 B1
(45) Date of Patent: Jun. 4, 2002

(54) SPACE-TIME DIVERSITY FOR WIRELESS SYSTEMS

(75) Inventors: Farrokh Rashid-Farrokhi, Manalapan; Reinaldo A. Valenzuela, Holmdel, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/187,878

(22) Filed: Nov. 6, 1998

(51) Int. Cl.$^7$ ............................................... H04B 1/69
(52) U.S. Cl. ...................................... 375/347; 375/140
(58) Field of Search ................................ 370/329, 310, 370/252; 375/347, 140

(56) References Cited

U.S. PATENT DOCUMENTS

| 5,592,490 A | * | 1/1997 | Barratt et al. | 370/310 |
| 5,867,478 A | * | 2/1999 | Baum et al. | 370/203 |
| 5,886,988 A | * | 3/1999 | Yun et al. | 370/329 |
| 6,006,110 A | * | 12/1999 | Raliegh | 455/561 |
| 6,091,955 A | * | 7/2000 | Aatlo et al. | 455/447 |

OTHER PUBLICATIONS

Rashid–Farrokhi Et Al, Transmit Breamforning and Power Control for Cellular Wireless Systems IEEE Journal on Selected Areas Od Communications vol. 16, 1–13, PPS 1437–1450, Oct. 1998.*

Rashid–Farrokhi Et Al, Power Control and Space–Time Diversity for CDMA Systems, Global Telecommunications Conference, Nov. 1998, pp 2134–2140.*

Rashid–Farrokhi, F., et als., "Transmit Beamforming and Power Control for Cellular Wireless Systems", IEEE Journal On Selected Areas In Communications, Online! vol. 16, 1–13, Oct. 1998, pps. 1437–1450.

* cited by examiner

*Primary Examiner*—Chi Pham
*Assistant Examiner*—Kevin M Burd
(74) *Attorney, Agent, or Firm*—Eugene J. Rosenthal

(57) ABSTRACT

The signal to interference and noise ratio (SINR) of wireless systems can be improved, if not optimized, by determining operating parameters used by the base station to substantially simultaneously control the transmit beam patterns that are each formed to establish a communication channel between a base station and a respective one of the wireless terminals as a function of received channel information from at least two of the wireless terminals. In an exemplary embodiment of the invention, the weight vectors and the power allocation employed by a base station are determined by the base station using information supplied by at least each of the wireless terminals served by the base station, and potentially from wireless terminals served by other base stations, e.g., in neighboring cells to the cell served by the base station, the information from the other cells being supplied via the neighboring cell base stations using inter-base-station communication, e.g., a wire line connection.

5 Claims, 2 Drawing Sheets

SPACE-TIME DIVERSITY FOR WIRELESS SYSTEMS

TECHNICAL FIELD

This invention relates to the art of wireless communication, and more particularly, to employing space-time diversity to increase the capacity of wireless systems.

BACKGROUND OF THE INVENTION

Prior art wireless communication systems, such as time division multiple access (TDMA) or code division multiple access (CDMA) wireless communications systems, are used for communicating between base stations and wireless terminals. When setting various parameters for the communication such prior art systems only consider the strength of the desired signal at the wireless terminal and fail to also take into account the interference caused by communication between the base station and others of the wireless terminals. Also, prior art wireless communication systems that employ so-called "power control," e.g., CDMA systems, perform the power control independent of any weight vectors that are used for beam forming at the base station. Additionally, power control at the base station in such prior art wireless communication systems is performed typically based only on either the pilot signal strength at the wireless terminal or the bit error rate (BER) at the wireless terminal. These design factors of prior art wireless systems cause their signal to interference and noise ratio (SINR) to be less than optimal, resulting in reduced system capacity, i.e., the system cannot serve as many active wireless terminals as it could with a higher SINR.

SUMMARY OF THE INVENTION

We have recognized that the signal to interference and noise ratio (SINR) of wireless systems can be improved, if not optimized, by determining operating parameters used by the base station to substantially simultaneously control the transmit beam patterns that are each formed to establish a communication channel between a base station and a respective one of the wireless terminals as a function of received channel information from at least two of the wireless terminals. In an exemplary embodiment of the invention, the weight vectors and the power allocation employed by a base station are determined by the base station using information supplied by at least each of the wireless terminals served by the base station, and potentially from wireless terminals served by other base stations, e.g., in neighboring cells to the cell served by the base station, the information from the other cells being supplied via the neighboring cell base stations using inter-base-station communication, e.g., a wire line connection.

DETAILED DESCRIPTION

Figure 1:
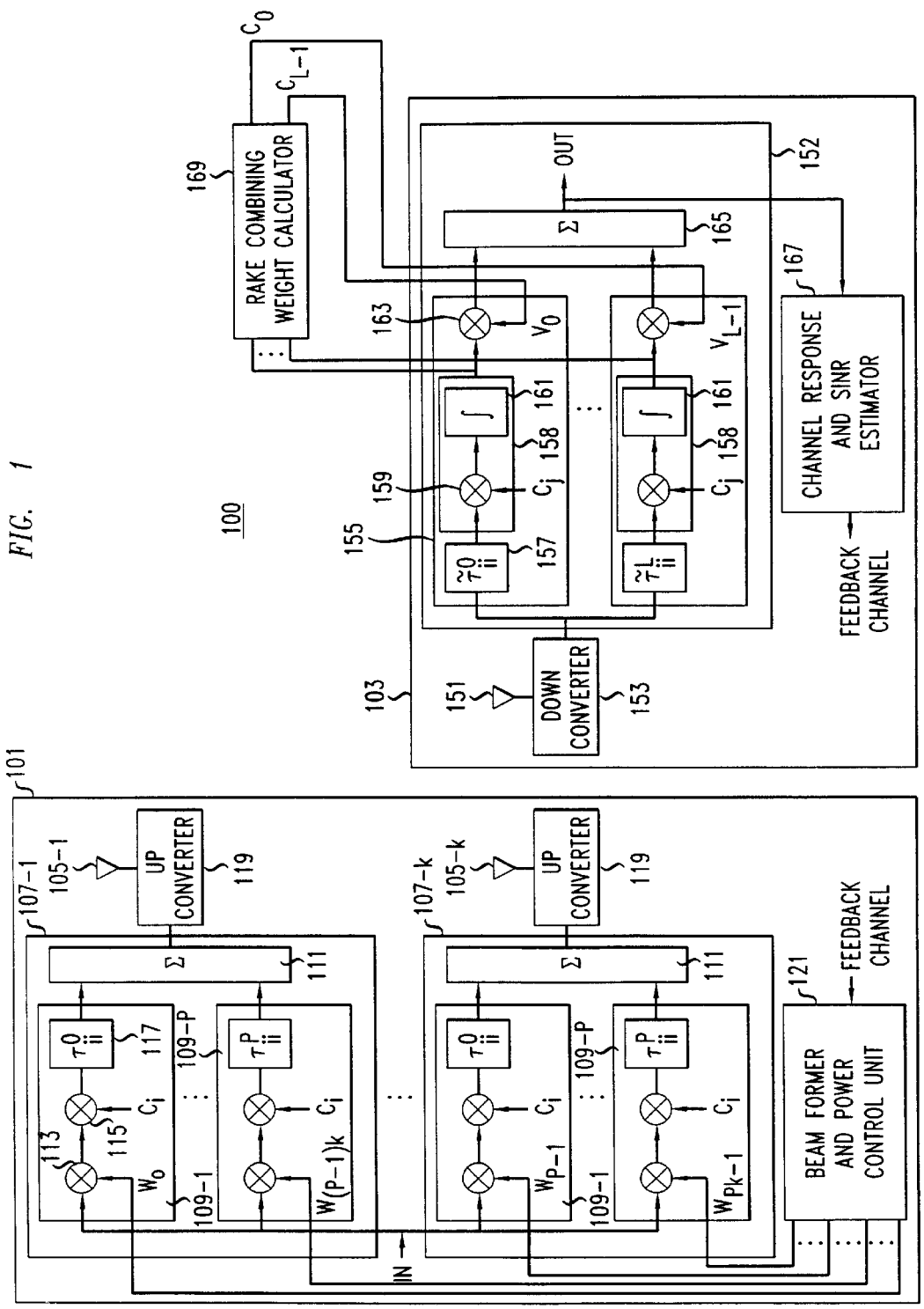
FIG. 1 shows a portion of an exemplary code division multiple access (CDMA) wireless communication system arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function.

The invention as defined by such claims resides in the fact that the functionalities provided by the various recited means are combined and brought together in the manner which the claims call for. Applicant thus regards any means which can provide those functionalities as equivalent as those shown herein.

FIG. 1 shows a portion of an exemplary code division multiple access (CDMA) wireless communication system 100. CDMA system 100 includes wireless transmitter 101 for one user which is used in a base station and wireless receiver 103 which is used in a wireless terminal. Both wireless transmitter 101 and wireless receiver 103 are arranged in accordance with the principles of the invention.

Wireless transmitter 101 includes antennas 105, including antennas 105-1 through 105-K. The value of K is selected by the system implementor as a function of the desired price, performance, and capacity of wireless communication system 100. Each of antennas 105 is fed by a signal supplied from a respective associated one of transmit modules 107. Each of transmit modules 107 includes a) P diversity modules 109, b) a combiner 111 and c) upconverter 119. The value of P is typically determined as a function of the desired channel performance. Typically the desired channel performance is selected by a standard setting committee.

Each of diversity modules 109 includes a beam former multiplier 113, a spreader multiplier 115, and delay element 117. Beam former multiplier 113 multiplies the signal to be transmitted by a beam forming coefficient. Each of the beam forming coefficients supplied to the various beam former multipliers 113 are said to be part of a space-time diversity weight vector W. The beam forming coefficients are generated by beam forming and power control unit 121 in accordance with the principles of the invention, as will be further elaborated on hereinbelow.

The output from each beam former multiplier 113 is supplied as an input to its respective associated multiplier 115, which multiplies its input from beam former 113 by a spreading code for the user being served by wireless transmitter 101. Should one desire to implement the invention in a time division multiple access (TDMA) system rather than a CDMA system, it is necessary to omit multiplier 115. Because the spreading code is made up of multiple chips for each bit of signal being transmitted, multiplier 115, which must multiply each bit by the chips of its spreading code, operates at a much greater rate of speed than does multiplier 113.

The output from each multiplier 115 is supplied as an input to its respective associated delay element 117. Each delay element 117 delays the signal supplied to it in a manner such that each delayed signal generated within a one of diversity modules 109 is delayed from any other signal generated within that one of diversity modules 109 by at least a delay of 1 chip. In other words, there is a phase difference of at least one chip between each signal generated within each of diversity modules 109. The particular delays may be specified by the system designer in response to system requirements, e.g., as specified by standard setting organizations, or the delays may be adaptively adjusted as a function of system performance.

Each diversity module 109 supplies its delayed and spread signal to its associated combiner 111. Each combiner 111 adds the delayed and spread signals which are supplied by each diversity module 109 within the same one of transit modules 107 as itself, and supplies the combined result to an associated upconverter 119. Each upconverter uses the result supplied by its associated combiner 111 to modulate a carrier signal. The modulated carrier signal is then supplied to antenna 105 for broadcast.

Note that for each wireless terminal served by the base station there are similar K transmit modules 107. However, each upconverter 119 is shared by the various transmit modules 107 of the different wireless terminals, i.e., each upconverter 119 upconverts a signal which is combined from each of the transmit modules 107, and the combined signal is supplied to one of the antennas 105 coupled to that upconverter. In other words, each base station has K times the maximum number of wireless terminals it can serve transmit modules 107, but only K upconverters 119 and only K antennas 105.

Receiver 103 is a so-called "rake" receiver. Receiver 103 includes a) antenna 151, b) down converter 153, c) receive module 152, and d) channel response and SINR estimator 167, and e) rake combining weight calculator 169. Other than rake combining weight calculator 169, those portions of receiver 103 shown in FIG. 1 are conventional and will only be briefly described.

Antenna 151 receives wireless signals that impinge upon it. Down converter 153 downconverts to baseband the wireless signals received by antenna 151. The baseband signal is then supplied to receiver module 152, which includes L rake receiver fingers 155 all of which is coupled to combiner 165. More specifically, the signal from down converter 153 is supplied to each rake receiver finger 155. Each rake receiver finger 155 includes delay element 157, despreader 158, and rake combining multiplier 163. Despreader 158 includes chip multiplier 159 coupled to integrator 161. Thus, the signal received at antenna 151 is downconverted, delayed, despread, and combined to form a decision statistic signal from which the particular bits received are determined.

Note that FIG. 1 shows the most common form of CDMA rake receiver. However, other embodiments of the invention may employ conventional two-dimensional rakes or an inventive rake receiver such as disclosed in our concurrently filed, commonly assigned copending U.S. patent application Ser. No. 09/188,021, which is incorporated herein by reference. Using either of the alternative rake receivers does not change the process. Only rake combining vector v is longer, to accommodate the additional dimension.

Figure 2:
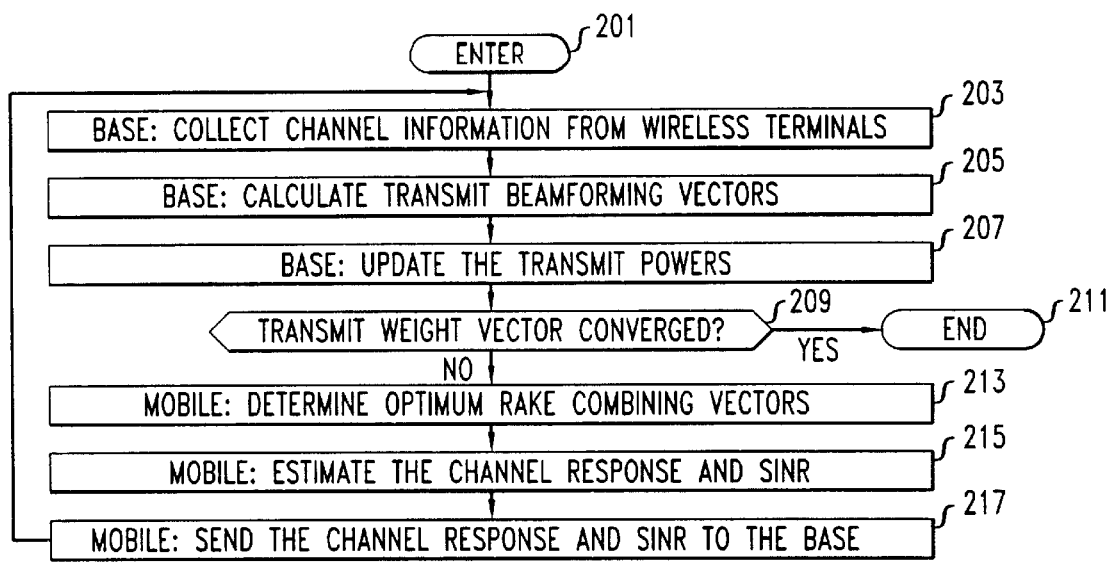
FIG. 2 shows an exemplary over-all process for the optimization of transmit beam forming weight vectors, transmit power allocation, and rake receiver combining vectors, in accordance with the principles of the invention.

FIG. 2 shows an exemplary over-all process for the optimization of 1) transmit beam forming weight vectors, 2) transmit power allocation, and 3) rake receiver combining vectors, in accordance with the principles of the invention. The process is entered in step 201 when a new user, e.g., one served by a wireless terminal (not shown) including wireless receiver 103 (FIG. 1) is to be served by the base station (not shown) incorporating wireless transmitter 101. The base station may already be operating prior to the entering into the process shown in FIG. 2. Alternatively, the process of FIG. 2 may be entered in step 201 periodically, e.g., with a time period approximating the amount of time for the channel between the base station and the wireless terminal to change by an amount that would necessitate a weight vector update. Note that changes in the channel may be caused by various factors, including: changes in atmospheric conditions; changes in the location of the wireless terminal; and changes in other objects along the path or in the environment, between the base station and the wireless terminal.

In step 203 the base station collects information about the channels between itself and the various wireless terminals. Such channel information may include the channel response and the SINR of the channel. A portion of the information may be provided directly by each of the wireless terminals that the base station is currently actively serving, e.g. by incorporating the information into the uplink communication, i.e., the link from wireless terminal to base station, which may be arranged using a frame structure, so that collectively the base station has information about all the wireless terminals it is serving. Additionally, it is possible that the base station receives channel information for wireless terminals served by other base stations, e.g., in cells neighboring the cell served by the base station, the channel information from the other cells being supplied via the neighboring cell base stations using inter-base-station communication, e.g., a wire line connection.

Next, in step 205, the base station uses the received channel information to calculate the transmit beamforming vectors, in accordance with an aspect of the invention. Additional details regarding the calculation of the transmit beamforming vectors in accordance with the invention are provided hereinbelow. Thereafter, in step 207, the base station performs base station transmit power control, and more specifically, the base station updates the power to be used for each wireless terminal that it is serving.

Conditional branch point 209 tests to determine if the sequence of transmit weight vectors which have been previously used within a specified time window has converged, i.e., the error vector norm, which is the square of vector elements of the difference between the current transmit weight vector and the previously employed weight vector, is below a specified threshold. If the test result in step 209 is YES, indicating that the transmit weight vectors have converged, the process exits in step 211. Alternatively, control may be passed back to step 203, e.g., if no further use can be made of the processing power that becomes available by not performing steps 203 through 209.

If the test result of step 209 is NO, indicating that the transmit weight vectors have not converged yet, control passes to step 213, in which each wireless terminal calculates its optimum rake receiver combining vector, e.g., the weights to be supplied to rake combining multiplier 163 of receiver 103 (FIG. 1), in accordance with an aspect of the invention. The calculation is performed by rake combining weight calculator 169, as described in further detail hereinbelow.

In step 215, each wireless terminal estimates the channel information, i.e., the channel response, which is the impulse response of the channel, using conventional techniques. Additionally, in step 215, each wireless terminal determines the signal to interference and noise ratio (SINR) using conventional techniques. Thereafter, in step 217, each wireless terminal transmits the estimated channel response and SINR to the base station. This information is incorporated into the wireless terminal's uplink, and it is received by the base station in step 203. Control then passes back to step 203 and the process continues as described above.

Figure 3:
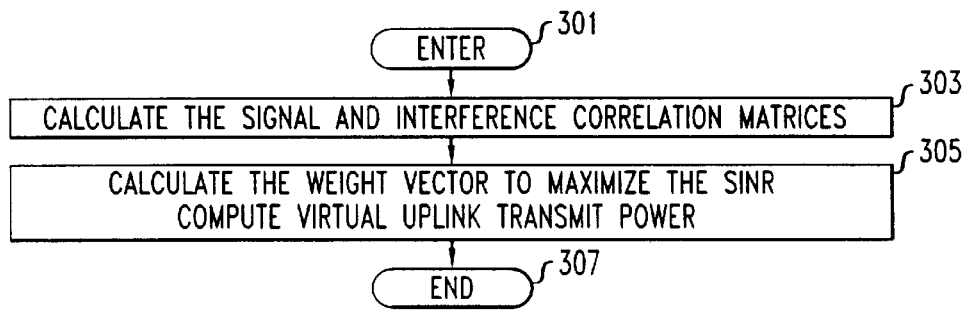
FIG. 3 shows, in flow chart form, an exemplary process for calculating the transmit beamforming vectors by the base station using the received channel information, in accordance with an aspect of the invention.

FIG. 3 shows, in flow chart form, an exemplary process for calculating the transmit beamforming vectors by the base station using the received channel information as recited in step 205 of FIG. 2, in accordance with an aspect of the invention. The process of FIG. 3 is entered, in step 301, whenever control passes to step 205 of FIG. 2. Next, in step 303, signal and interference correlation matrices $\Phi_i^s$, $\Phi_i^I$ are calculated in accordance with an aspect of the invention. More specifically, in accordance with an aspect of the invention, the signal and interference correlation matrices are developed in the base station for a virtual uplink network which is the mathematical equivalent of the actual downlink set of channels extending from the base station to the wireless terminals.

To develop the virtual uplink network it is assumed that the transmitter, i.e., the base station, is the receiver, and that the receiver, i.e., the wireless terminal, is the transmitter. Additionally, it is assumed that the channel response for the virtual uplink network is the same as that for the collected set of downlink channels. Once the virtual uplink network is known, the signal and interference correlation matrices are developed therefor in the conventional manner.

Thereafter, in step 305, the weight vector W for each wireless terminal i at iteration n of step 205 is calculated to maximize the SINR, $\Gamma$, using the signal and interference correlation matrices, $\Phi_i^s$, $\Phi_i^I$ respectively, of the virtual uplink network. This is achieved by computing:

$$W_i^n = \arg\max_{w_i} \Gamma_i(W_i, P^n, V^{n-1})$$

$$= \arg\max_{w_i} \frac{w_i^H \Phi_i^s w_i}{w_i^H \Phi_i^I w_i}$$

$$= \arg\max_{|W_i|=1} \frac{P_i^{n-1} |W_i^H F_{ii}^s v_i|^2}{\sum_j P_j^{n-1} |W_i^H F_{ji}^I v_i|^2 + N_i |v_i|^2}$$

where:

$F_{ji}^I$ is the channel response from the $j^{th}$ wireless terminal to the base station receiver associated with the $i^{th}$ wireless terminal, which may belong to the same base station or may belong to another base station;

$F_{ii}^S$ is the channel response from the $i^{th}$ wireless terminal to the base station receiver associated with the $i^{th}$ wireless terminal;

$N_i$ is the additive noise power of the $i^{th}$ wireless terminal;

P is a power vector each element of which is the power of a virtual transmitter;

V is a set of rake combining vectors $v_i$ for each wireless terminal; and

H means Hermitian, which is the complex conjugate transpose of a vector or a matrix.

Note that each individual component of each vector $v_i$, which corresponds to a particular wireless terminal, is supplied to a respective one of rake combining multipliers 163 of wireless receiver 103 of that particular wireless terminal. Also note that since this step requires the power allocations from the previous iteration of the process of FIG. 2 that the first time the process is executed an arbitrary power allocation may be employed. Once the process is operating the power allocation will eventually move in the direction of the desired solution, regardless of the initial values.

Further note that each wireless terminal is associated with corresponding circuitry in the base station that is presently serving it, the corresponding circuitry including, using the example shown in FIG. 1, diversity modules 109, combiner 111, and beamformer and power control unit 121. Each wireless terminal and its corresponding base station circuitry are identified by a common identifier. For purpose of simplicity of matrix operation, the identifier is typically a number ranging from 1 to M, where M is the total number of users being served by the entire wireless system, which may be a network of multiple base stations. However, other identifiers may be used at the discretion of the implementor, e.g., the telephone number corresponding to the wireless terminal. Furthermore, various identifiers representing a wireless terminal may be associated together, and the one appropriate for each function to be performed is selected when needed.

Additionally, in step 305, the virtual uplink power vector is calculated by computing $$P_i^n = \frac{\gamma_i P_i^{n-1}}{\Gamma_i(W_i^n, P^{n-1}, V^{n-1})}$$

where $p_i^n$ is the virtual uplink transmit power used by the $i^{th}$ wireless terminal to transmit to the base station at the $n^{th}$ iteration of computing the virtual uplink power vector; $\gamma_i$ is the target SINR for the $i^{th}$ base station—which is a specification of the link quality and may be selected by the user—; and $\Gamma_i$ is the SINR of the $i^{th}$ base station.

The process then exits in step 307. Note that upon exiting control passes to step 207 of FIG. 2.

As described above in connection with step 207 of FIG. 2, the base station performs base station transmit power control, and more specifically, the base station updates the power to be used for each wireless terminal that it is serving. The updated power to be used by the base station for each wireless terminal that it is serving may be computed by $$\tilde{P}_i^n = \frac{\gamma_i \tilde{P}_i^{n-1}}{\tilde{\Gamma}_i(W^n, v_i^{n-1}, \tilde{P}^{n-1})},$$

where $\tilde{P}_i^n$ is the actual transmit power used by the base station to transmit to the $i^{th}$ wireless terminal; $\tilde{P}^{n-1}$ is the downlink transmit power vector from the previous execution of step 213; $v_i^{n-1}$ is the rake combining vectors $v$ for the $i^{th}$ wireless terminal from the previous power control iteration; $\gamma_i$ is the target SINR for the $i^{th}$ wireless terminal—which is a specification of the link quality and may be selected by the user—; $\Gamma_i$ is the SINR at the $i^{th}$ wireless terminal; and $W^n$ is the set of transmit weight vectors.

As described above in connection with step 213 of FIG. 2, each wireless terminal calculates its optimum rake receiver combining vector, e.g., the weights to be supplied to rake combining multiplier 163 of receiver 103 (FIG. 1), in accordance with an aspect of the invention. The optimum rake receiver combining vectors may be determined by computing $$v_i^n = \arg\max_{|v_i|=1} \Gamma_i(W^n, v_i, \tilde{P}^{n-1})$$

$$= \arg\max_{w_i} \frac{v_i^H \Phi_i^s v_i}{v_i^H \Phi_i^I v_i}$$

$$= \arg\max_{|v_i|=1} \frac{\tilde{P}_i^n |W_i^{nH} F_{ii} v_i|^2}{\sum_j \tilde{P}_j^n |W_j^{nH} F_{ij} v_i|^2 + N_i |v_i|^2}$$

where $\Phi_i^s$ is the correlation matrix of the desired signal at the $i^{th}$ wireless; $\Phi_i^I$ is the interference correlation matrix at the $i^{th}$ wireless.

The foregoing techniques, when used in combination, result in optimal power allocation and beam forming vectors, resulting in maximum system performance, which can be translated into maximum system capacity per a given SINR or a maximum SINR for a given number of wireless terminals, e.g., users. However, it is recognized that not all of the foregoing techniques need be applied together in one system. Instead, applying only some of the techniques will result in improved, albeit not optimal, system performance. Similarly, there are suboptimal techniques that may be employed, individually or collectively, in lieu of the foregoing techniques, that will result in improved, although not optimal, system performance.

For example, instead of developing the weight vector W for each wireless terminal i at iteration n of step 205 to maximize the SINR, $\Gamma$, using the signal correlation matrix, $\Phi_i^s$, of the virtual uplink network, as described above in connection with step 305, the weight vector W for each wireless i at iteration n of step 205 is computed to only maximize the gain for the desired user i as follows:

$$W_i^n = \arg\max_{w_i} w_i^H \Phi_i^s w_i$$

$$= \arg\max_{|W_i|=1} |W_i^H F_{ii}^s v_i|^2$$

where all the variables have already been described hereinabove. A further alternative to the method for developing the weight vector W for each wireless terminal i at iteration n of step 205 by maximizing the SINR, $\Gamma$, is to maximize the gain from the base station to the desired wireless terminal but with a constraint that the totally transmitted interference to other wireless terminals is limited by solving the following constrained gain maximization:

$$W_i^n = \arg\max_{w_i} w_i^H \Phi_i^s w_i$$

$$\text{subject to } \sum_i w_i^H \Phi_i^I w_i < c$$

$$= \arg\max_{w_i} |W_i^H F_{ii}^s v_i|^2$$

$$\text{subject to } \sum_j |W_j^H F_{ji}^I v_i|^2 < c$$

where c is an arbitrary constant that is eventually canceled out when the base station transmit power control is performed in step 207. Thus no specific value of c need be selected.

Figure 4:
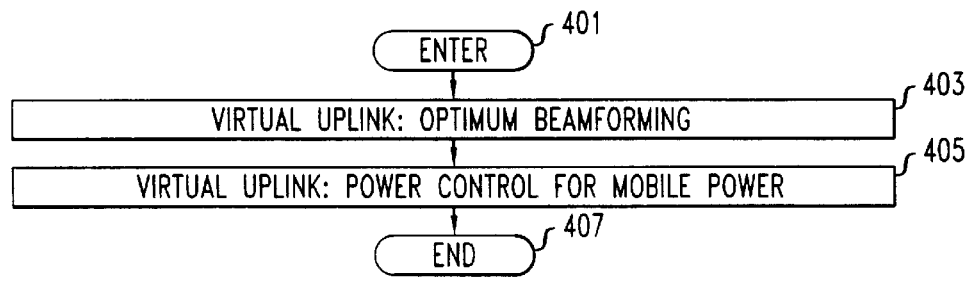
FIG. 4 shows an exemplary process for maximizing the minimum signal to interference ratio (SIR) of a virtual uplink network that is used to represent the downlink of a CDMA system, in accordance with an aspect of the invention.

FIG. 4 shows an exemplary process for maximizing the minimum signal to interference ration (SIR) of the virtual uplink network that is used to represent the downlink of the system, in accordance with an aspect of the invention. SIR is similar to SINR but the additive noise is not taken into account. In general, maximizing the minimum SIR is achieved by setting all of the SIRs of the virtual uplink network to a common value and then attempting to maximize this common value. This can be expressed mathematically as the need to solve.

$$\hat{W}_i = \arg\max_W SIR_i(W_i, P, V).$$

The process would be performed as an alternative to steps 205 and 207 of FIG. 2.

Thus, more specifically, the process shown in FIG. 4 is entered in step 401 at the conclusion of execution of step 203. Next, in step 403, the SIR is maximized for the virtual uplink network to yield beamforming weight vectors, which are calculated by:

$$W_i^n = \arg\max_{w_i} SIR_i(W_i, P^n, V^{n-1})$$

-continued $$= arg\max_{w_i} \frac{w_i^H \Phi_i^s w_i}{w_i^H \Phi_i^I w_i}$$

$$= arg\max_{|W_i|=1} \frac{P_i^{n-1} |W_i^H F_{ii}^s v_i|^2}{\sum_j P_j^{n-1} |W_i^H F_{ji}^I v_i|^2}$$

where all the variables are as defined hereinabove. Note that since this step requires the power allocations from the previous iteration of the process of FIG. 4 the first time the process is executed an arbitrary power allocation may be employed. Once the process is executing the power allocation will eventually move in the direction of the desired solution, regardless of the original values.

Next, in step 405, power control is performed for the virtual uplink network. In other words, each channel of the virtual uplink network is allocated a transmit power, albeit a virtual one. This is achieved by first constructing two gain matrices, D and F. D is the desired link gain and F is the gain for the interference on the desired link whose weight vector is w. Then the spectral radius, i.e., the maximum eigenvalue, of the product of D and F is determined. Thereafter, the optimal power allocation for the virtual uplink is determined by finding the eigenvector corresponding to the spectral radius of the product of D and F. Mathematically, the forgoing is represented as follows:

$$[D_w]_{ii} = 1/|W_i^H F_{ii}^s v_i|^2$$

$$[F_w]_{ji} = |W_j^H F_{ji}^I v_i|^2$$

$$\gamma_{max} = \rho(D_w F_w)$$

$$P^{n+1} = \gamma_{max} D_w F_w P^n$$

where $\rho$ is the spectral radius and $\gamma_{max}$ is the maximum achievable SIR.

What is claimed is:

1. The invention received channel information is used to develop signal and interference correlation matrices, $\Phi_i^s$, $\Phi_i^I$ respectively, in said base station for a virtual uplink network, said virtual uplink network being mathematically equivalent to an actual downlink set of channels extending from said base station to said wireless terminals, and wherein said operating parameters include weight vectors, and wherein a weight vector W for each wireless terminal i at iteration n of weight vector calculation is calculated to maximize a signal to interference and noise ratio (SINR), $\Gamma$, by computing:

$$W_i^n = arg\max_{w_i} \Gamma_i(W_i, P^n, V^{n-1})$$

$$= arg\max_{w_i} \frac{w_i^H \Phi_i^s w_i}{w_i^H \Phi_i^I w_i}$$

$$= arg\max_{|W_i|=1} \frac{P_i^{n-1} |W_i^H F_{ii}^s v_i|^2}{\sum_j P_j^{n-1} |W_i^H F_{ji}^I v_i|^2 + N_i |v_i|^2}$$

where:

$F_{ji}^I$ is a channel response from a $j^{th}$ wireless terminal of said wireless terminals to a base station receiver associated with an $i^{th}$ wireless terminal of said wireless terminals, which may be associated with said base station or another base station;

$F_{ii}^S$ is a channel response from an $i^{th}$ wireless terminal of said wireless terminals to a base station receiver associated with an $i^{th}$ wireless terminal of said wireless terminals;

$N_i$ is additive noise power of said $i^{th}$ wireless terminal;

P is a power vector;

V is a set of rake combining vectors $v_i$ for wireless terminal of said wireless terminals; and H means Hermitian.

2. A method for use in a code division multiple access (CDMA) wireless base station, comprising the steps of:

receiving at said base station downlink channel information from a plurality of wireless terminals, each of said wireless terminals including a rake receiver;

determining operating parameters used by said base station to substantially simultaneously control each respective transmit beam pattern which is formed to establish a communication channel between said base station and each respective one of said wireless terminals that is simultaneously communicating with said base station on said channel as a function of said received channel information;

wherein said received channel information is used to develop signal correlation matrix, $\Phi_i^s$ in said base station for a downlink from said base station to an $i^{th}$ one of said wireless terminals, and wherein said operating parameters include weight vectors, and wherein a weight vector W for each wireless terminal i at iteration n of weight vector calculation is calculated to maximize the gain by computing:

$$W_i^n = arg\max_{w_i} w_i^H \Phi_i^s w_i$$

$$= arg\max_{|W_i|=1} |W_i^H F_{ii}^s v_i|^2$$

where:

$F_{ii}^S$ is a channel response from an $i^{th}$ wireless terminal of said wireless terminals to a base station receiver associated with an $i^{th}$ wireless terminal of said wireless terminals;

$v_i$ is a rake combining vector for an $i^{th}$ wireless terminal of said wireless terminals; and H means Hermitian.

3. The invention as defined in claim 1 wherein said received channel information is used to develop signal and interference correlation matrices, $\Phi_i^s$, $\Phi_i^I$ respectively, in said base station for a virtual uplink network, said virtual uplink network being mathematically equivalent to an actual downlink set of channels extending from said base station to said wireless terminals, and wherein said operating parameters include weight vectors, and wherein a weight vector W for each wireless terminal i at iteration n of weight vector calculation is calculated to maximize a signal to interference ratio (SIR), by computing:

$$W_i^n = arg\max_{w_i} SIR_i(W_i, P^n, V^{n-1})$$

$$= arg\max_{w_i} \frac{w_i^H \Phi_i^s w_i}{w_i^H \Phi_i^I w_i}$$

$$= arg\max_{|W_i|=1} \frac{P_i^{n-1} |W_i^H F_{ii}^s v_i|^2}{\sum_j P_j^{n-1} |W_i^H F_{ji}^I v_i|^2}$$

where:

$F_{ji}^I$ is a channel response from a $j^{th}$ wireless terminal of said wireless terminals to a base station receiver associated with an $i^{th}$ wireless terminal of said wireless terminals, which may be associated with said base station or another base station;

$F_{ii}^S$ is a channel response from an $i^{th}$ wireless terminal of said wireless terminals to a base station receiver associated with an $i^{th}$ wireless terminal of said wireless terminals;

$N_i$ is additive noise power of said $i^{th}$ wireless terminal;

P is a power vector;

V is a set of rake combining vectors $v_j$ for wireless terminal of said wireless terminals; and H means Hermitian.

4. The invention as defined in claim 3 wherein power control is performed for the virtual uplink network by performing the steps of:

constructing two gain matrices, D and F, where D is a desired link gain and F is a gain for interference on the desired link whose weight vector is w;

determining a spectral radius for a product of D and F; and and finding an eigenvector corresponding to the spectral radius of the product of D and F.

5. The invention as defined in claim 3 wherein power control is performed for the virtual uplink network by solving:

$$[D_w]_{ii} = 1/|W_i^H F_{ii}^S v_i|^2$$

$$[F_w]_{ji} = |W_j^H F_{ji}^I v_i|^2$$

$$\gamma_{max} = \rho(D_w F_w)$$

$$P^{n+1} = \gamma_{max} D_w F_w P^n$$

where

D and F are gain matrices, D being a desired link gain and F being a gain for interference on the desired link whose weight vector is w;

P is a power vector;

$v_i$ is a rake combining vector for an $i^{th}$ wireless terminal of said wireless terminals;

$\rho$ is the spectral radius;

$\gamma_{max}$ is the maximum achievable signal to interference ratio (SIR); and H means Hermitian.

\* \* \* \* \*